United States Patent [19]

Bohnen

[11] Patent Number: 4,754,367

[45] Date of Patent: Jun. 28, 1988

[54] ELECTRIC SWITCHBOARD CELL HAVING A POSITIONING DRIVE FOR A MOVABLY ARRANGED SWITCHGEAR AND LOCKING DEVICE FOR SWITCHBOARD CELL DOOR

[75] Inventor: Peter Bohnen, Berlin, Fed. Rep. of Germany

[73] Assignee: Siemens Aktiengesellschaft, Berlin and Munich, Fed. Rep. of Germany

[21] Appl. No.: 940,042

[22] Filed: Dec. 10, 1986

[30] Foreign Application Priority Data

Dec. 20, 1985 [DE] Fed. Rep. of Germany ... 8536282[U]

[51] Int. Cl.⁴ .............................................. H01H 9/20
[52] U.S. Cl. ................................. 361/344; 200/50 R; 200/50 A; 200/50 AA; 361/339
[58] Field of Search ............ 200/50 A, 50 AA, 50 B, 200/50 R; 361/336–339, 343–344, 357, 427

[56] References Cited

U.S. PATENT DOCUMENTS

| | | | |
|---|---|---|---|
| 2,777,024 | 1/1957 | West | 200/50 AA |
| 2,888,615 | 5/1959 | Tusing | 200/50 AA |
| 3,715,552 | 2/1973 | Umezu et al. | 200/50 A |
| 4,011,424 | 3/1977 | Ericson et al. | 200/50 AA |
| 4,112,269 | 9/1978 | Nelson et al. | 200/50 AA |

FOREIGN PATENT DOCUMENTS

2116368 9/1983 United Kingdom ............ 200/50 A

Primary Examiner—A. D. Pellinen
Assistant Examiner—Gregory D. Thompson
Attorney, Agent, or Firm—Kenyon & Kenyon

[57] ABSTRACT

An electric switchboard cell includes a positioning drive with a threaded spindle for a movably arranged switchgear and a door. At the bottom of the switchboard cell, a latch lever is pivoted which has a cam with which a guiding member of the positioning drive cooperates. The latch lever is pivoted by means of the cam, when the disconnect position of the switchgear is reached, into a position in which its locking projection is disengaged from a lock bracket attached to the door. The lock bracket is attached pivotally to a pillow block mounted to the door and can be disengaged from the locking projection by authorized personnel for defeating the locking device, e.g., for servicing.

6 Claims, 2 Drawing Sheets

ELECTRIC SWITCHBOARD CELL HAVING A POSITIONING DRIVE FOR A MOVABLY ARRANGED SWITCHGEAR AND LOCKING DEVICE FOR SWITCHBOARD CELL DOOR

BACKGROUND OF THE INVENTION

The present invention relates to an electric switchboard cell having a positioning drive comprising a threaded spindle for moving a switchgear contained in the cell, and further having a door closing the switchboard cell.

Operating such a switchboard cell can be dangerous to the user, for instance, if the door of the switchboard cell is opened and not all parts located in the switchboard cell are disconnected from the voltage source.

SUMMARY OF THE INVENTION

It is an object of the invention to provide a device which is independent of the normal door closure and which releases the door of the switchboard cell for opening only if the switchgear located in the switchboard cell is in its disconnect position and thus carries no voltage.

The above and other objects of the present invention are achieved by an electric switchboard cell having a positioning drive comprising threaded spindle means for moving a switchgear, a door closing the switchboard cell, and further having a pivoted latch lever arranged at the bottom of the switchboard cell, a cam, a guiding member connected to the positioning drive cooperating with the cam, and a lock bracket cooperating with a projection of the latch lever attached to the door of the switchboard cell.

The cam can be designed without difficulty in such a manner that the latch lever is lifted from the lock bracket only shortly before reaching the disconnect position of the switchgear and the door of the switchboard cell is released thereby.

In particular, the cam can be realized as a curved or angled-off elongated hole (i.e. extenting at an angle from the generally longitudinal extent of the hole), while the guiding member is designed as a guiding pin which is connected to a part movable in the operating direction of the positioning drive. To achieve the desired safety function, easily manufactured and rugged parts are required.

If, according to a further embodiment of the invention, the lock bracket is pivoted at a pillow block against the force of a spring and the locking projection of the latch lever has an inclined starting surface which engages with the lock bracket in the closing direction of the door, the new device can be defeated when required in certain circumstances, e.g., servicing. Thus, the door of the switchboard cell can be opened also if the switchgear is not in the disconnect position. This is necessary, for instance, for performing ajustment work by a specialist or service man. This can be achieved if the lock bracket has a driver which is parallel to the plane of the door if it is in an unactuated position and which is accessible through an opening of the door for intentionally operating the lock bracket. It is advisable to make the opening of the door with a small diameter for the passage of a tool and to make the opening so that it can be covered by a closing member. In this manner precautions are taken against undesirable and dangerous manipulation of the device to such an extent that accidental or abusive cheating of the door lock is impossible.

It is customary to arrange movably arranged switchgear not directly in a corresponding space of a switchboard cabinet or a switching installation, but to provide a so-called pull-out frame which accommodates the switchgear and which in turn is fastened in the switchboard cell or a control cabinet. In a design of the switchboard cell in this manner, it is advisable to arrange the latch lever on a base plate of the pull-out frame and to fasten the guiding pin at a cross piece which functions as a movable abutment of the threaded spindle.

BRIEF DESCRIPTION OF THE DRAWINGS

The invention will be explained in greater detail in the following detailed description with reference to the drawings, in which.

DETAILED DESCRIPTION

Figure 1:
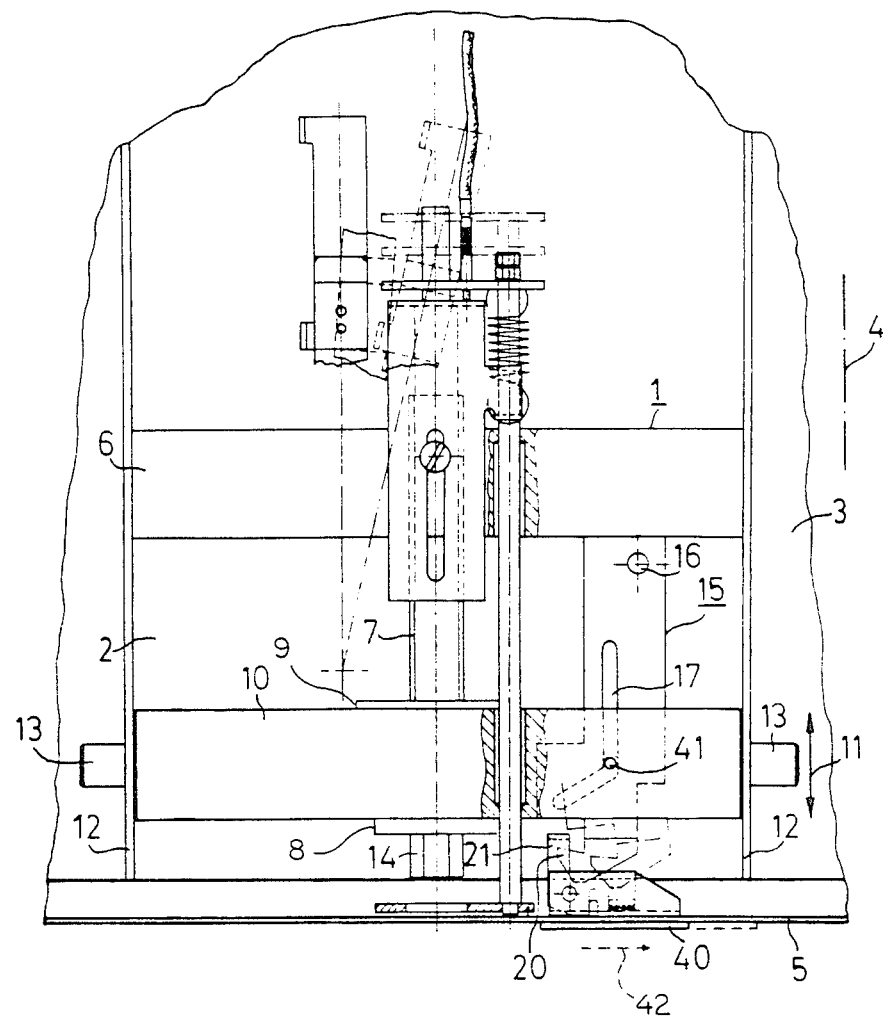
FIG. 1 shows a top detailed view of a switchboard cell having a positioning drive for moving switchgear.
Figure 2:
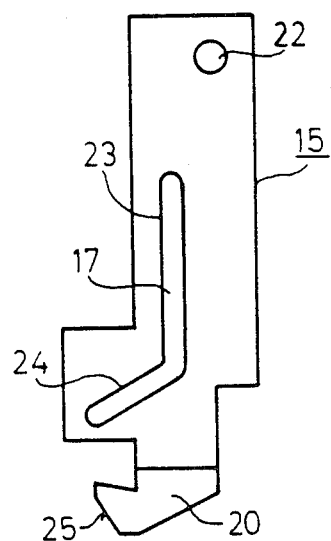
FIGS. 2 and 3 show a latch lever in two orthogonal views, FIG. 2 being a top view and FIG. 3 being a side view.
Figure 3:
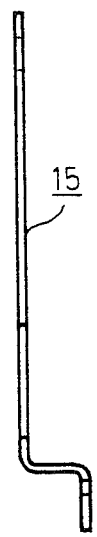

In FIG. 1, a positioning drive 1, designated generally with 1, is shown which is located at the base plate 2 of a pull-out frame 3. The pull-out frame in turn is installed in a switchboard cell 4 indicated in FIG. 1. The opening of the switchboard cell 4 can be closed by a partially shown door 5.

The positioning drive comprises a cross piece 6 which is connected to the base plate 2 and serves as a nut of the threaded spindel 7. A further cross piece 10 forms a movable abutment of the threaded spindle 7 and can therefore be positioned by the threaded spindle in the directions of the double arrow 11. The movable cross piece 10 is disposed between two collars 8 and 9 positioned on the threaded spindle 7. Pins 13 extending through openings in lateral guiding jaws 12 serve for coupling of the positioning drive to a switchgear, not shown, for instance, a low-voltage circuit breaker. The circuit breaker can therefore be moved likewise in the direction of the double arrow 11 by actuating the threaded spindle 7 by means of a tool that can be placed on the head 14 of the threaded spindle 7. The shifting serves in particular for moving the switchgear of the circuit breaker selectably into its operating position, a test position or a disconnect position.

The door 5 of the switchboard cell 4 is supposed to be openable only if the switchgear is in its disconnect position and therefore, all electrical connections between the switchgear and the stationary contacts of the switchboard cell 4 are interrupted. To this end, a latch lever 15 can be pivoted at the base plate 2 of the pull-out frame 3 about a bearing pin 16. The latch lever 15 has an elongated hole 17 with a bend, as well as a locking projection 20 which cooperates with a lock bracket 21 attached to the inside of the door 5. Details of the latch lever 15 and the lock bracket 21 will be explained in the following, referring to FIGS. 2, 3 and 4, 5 respectively.

The latch lever 15 consists of sheet metal of suitable thickness and has at one end thereof a bearing opening 22. The elongated hole 17 has a longer section 23 extending in the longitudinal direction of the lock lever 15 as well as a section 24 angled-off relative to this section, the operation of which will be explained later. The locking projection or nose 20 is in a place parallel to the longitudinal extent of the latch lever at the end of the latch lever 15 opposite the bearing opening 22. The outside of the locking projection is provided with an inclined starting surface 25 which engages a lock bracket 21 mounted to the door when the door 5 (FIG. 1) is closed with the latch lever pivoted on its pivot 16 to the left.

Figure 4:
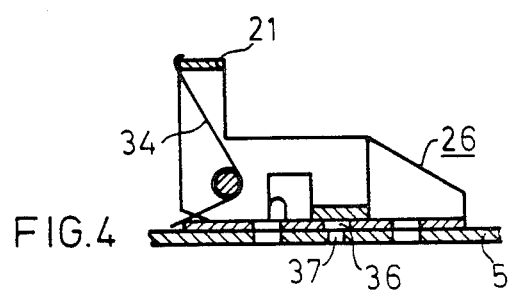
FIGS. 4 and 5 likewise show a pillow block with a lock bracket in two orthogonal views, FIG. 4 being a top view and FIG. 5 being a rear view.
Figure 5:
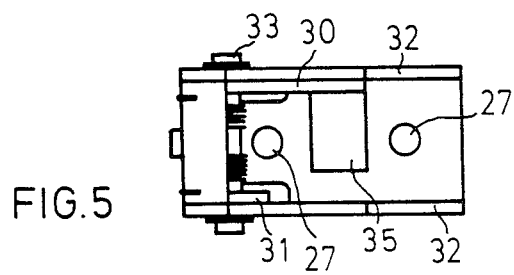

As is shown in FIGS. 4 and 5, the lock bracket 21 is fastened to a pillow block 26 which has an approximately U-shaped profile and has in its central part openings 27 for fastening the pillow block to the door 5 (FIG. 1). The lock bracket 21 has lateral legs 30 and 31, the spacing of which is made so that they can be received between the legs 32 of the pillow block 26. A torsion spring 34 pretensions the lock bracket into a position at right angles to the plane of the central part of the pillow block 26.

The leg 30 of the lock bracket 21 is made longer than the leg 31 and has an angled-off 90° portion 35 which can be used as a driver for intentionally actuating the lock bracket 21. To this end, the central part of the pillow block 26 is provided with an aperture 36 opening below the angled-off portion 35. A suitable tool can be introduced into an opening 37 in the door 5 in order to unlatch the door 5 if this is necessary for carrying out special work for example, servicing, pon the switchboard cell 4. At the door 5 there is a covering member 40 which can be moved, for instance, in a straight line in a direction of the arrow 42 or tiltably and covers the opening in the door 5. It is advisable to make the dimensions of this opening so that only a tool with a partially small diameter can be inserted. In this manner it is easy to prevent that customarily available tools, for instance, wrenches, spherical styli or similar devices can be misused.

The latch lever 15 cooperates with a guiding pin 41 which, according to FIG. 1, is fastened to cross piece 10 in such a manner that it engages the elongated hole 17. The position of the cross piece 10 shown there corresponds to the test position of the movable switchgear. If the latter is shifted further in the direction of the door 5 by further rotation of the threaded spindle 7, the guiding pin 41 moves into the angled-off section 24 of the elongated hole 17, whereby the latch lever 15 is swung counterclockwise in FIG. 1 about the bearing pin 16. The locking projection 20 is thereby disengaged from the lock bracket 21. The door 5 can then be opened in the customary manner.

If the positioning drive is actuated in the reverse direction, the latch lever 15 is swung in the reverse direction after the door 5 is closed by the guiding pin 41 until the locking projection 20 again engages behind the lock bracket 21. Upon further motion of the switchgear and a corresponding shift of the cross piece 10 into the interior of the switchboard cell 4, the latch lever 15 . remains uninfluenced because the section 23 of the elongated hole 17 extends in the direction of the shift.

If it is necessary to open the door 5 if the switchgear is not in its disconnect position, this is possible in the manner already described by inserting a suitable tool through the opening of the door 5 and the opening 36 of the pillow block 26, by swinging the lock bracket 21 against the force of the spring 34 and by taking it out of engagement with the locking projection 20. After the work is completed, however, the door 5 can be closed without special preparation because the lock bracket 21 arrives at the inclined starting surface 25 of the locking projection 20 and thereby snaps in automatically.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawing are, accordingly, to be regarded in an illustrativew rather than a restrictive sense.

What is claimed is:

1. An electric switchgear cell for housing a drawout switchgear, the cell comprising a door for closing off the cell and a positioning drive means permitting movement of the switchgear between an operative position and a disconnected position, a lock bracket being attached to a side of the door facing the switchgear, a pivotably mounted latch lever being provided in the cell having a projecting nose engaging the lock bracket in the closed position of the door and further having a guide means cooperating with guide means, the cam means being attached to the positioning drive means and being displaceable by operating the positioning drive means so as to pivot the latch lever and move the projecting nose of the latch lever into engagement with the lock bracket when the switchgear is moved into the operative position and out of engagement with the lock bracket when the switchgear is moved into the disconnected position.

2. The switchgear cell recited in claim 1, wherein the cam means comprises a curved or angled-off elongated hole provided in the latch lever and the guide means comprises a guiding pin connected to a member which is part of the positioning drive means, said member adapted to be coupled to the switchgear and being movable with the switchgear.

3. The switchgear cell recited in claim 1, wherein the lock bracket is pivotally supported on a pillow block means and is biased into a locking position with the latch lever by a spring and the projecting nose of the latch lever has an inclined starting surface for allowing pivoting of the lock bracket when the door is closed while the latch lever is in a position corresponding to the operative position of the switchgear.

4. The switchgear cell recited in claim 3, wherein the lock bracket has an angled-off portion which is parallel to the plane of the door in an unactuated position of the angled-off portion, said angled-off portion being accessible through an opening in the door for enabling actuation of the lock bracket, thereby allowing opening of the door even when the switchgear is in the operative position.

5. The switchgear cell recited in claim 4, wherein the opening in the door is dimensioned such that a tool may be inserted to actuate the lock bracket, the tool having a small diameter so as to prevent misuse by unauthorized personnel, said opening being further provided with a covering means.

6. The switchgear cell recited in claim 1, wherein the latch lever is arranged on a bottom plate of a framework adapted to receive the switchgear, the guiding pin being disposed on said member comprising a first crossbar movable with respect to the bottom plate and adapted to be coupled to the switchgear, the first crossbar having an opening for receiving a spindle, the spindle having a threaded part for engaging a threaded opening of a second crossbar and two collars engaging the first crossbar on both sides of the opening, the second crossbar being fixedly mounted with respect to the bottom plate and acting as a nut for the threaded spindle, the spindle moving the first crossbar between positions corresponding to the operative position and the disconnected position of the switchgear by being rotated in accordance with the direction of the thread of the threaded spindle.

* * * * *